UNITED STATES PATENT OFFICE.

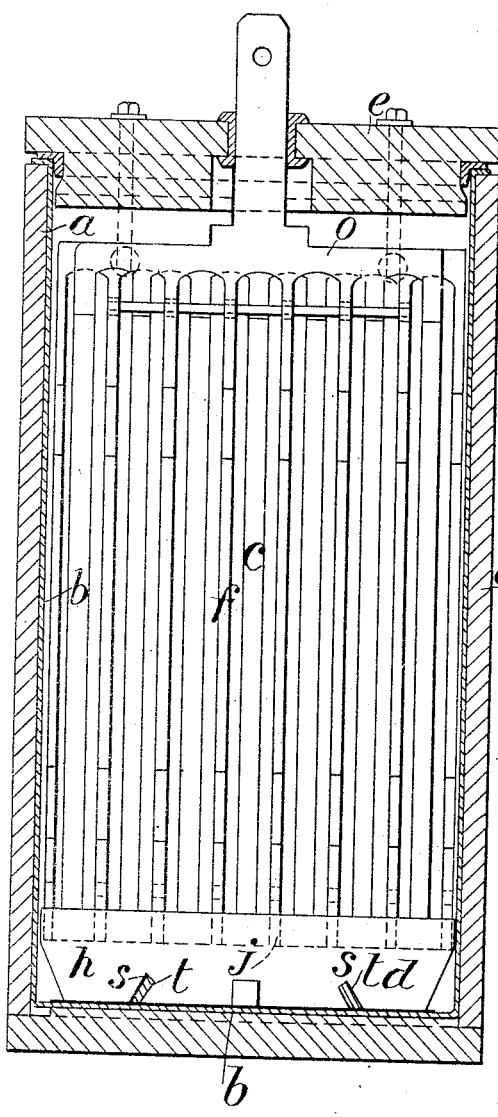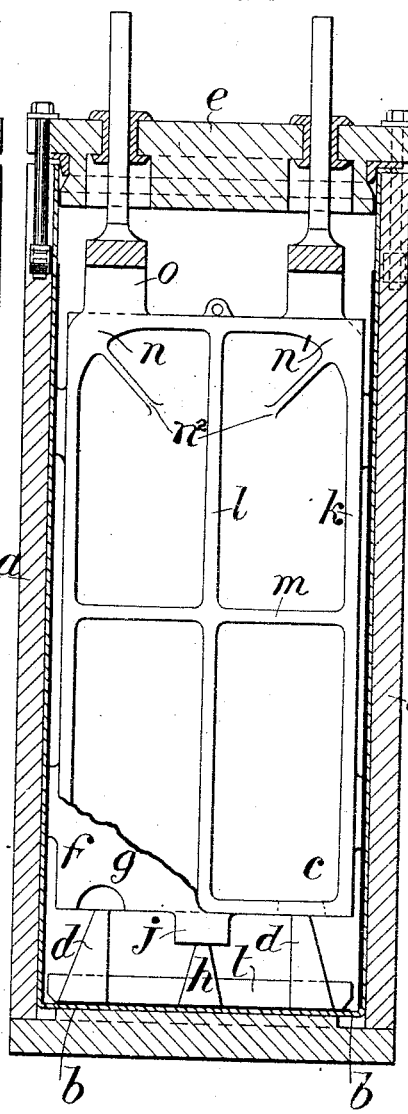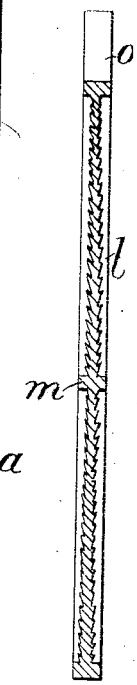

ALFRED HENRY DARKER, OF BLACKHEATH, ENGLAND.

SECONDARY BATTERY.

1,039,907.  Specification of Letters Patent.  Patented Oct. 1, 1912.

Application filed February 12, 1910. Serial No. 543,467.

*To all whom it may concern:*

Be it known that I, ALFRED HENRY DARKER, a subject of the King of Great Britain, residing at No. 41 Lee Terrace, Blackheath, in the county of Kent, England, engineer, have invented new and useful Improvements in Secondary Batteries, of which the following is a specification.

This invention relates to improvements in secondary batteries and particularly those in which the plates rest on a pair of so-called wooden cradles or strips of more or less triangular section. It frequently happens that deposits accumulate on the tops of these cradles until the deposits actually form a connection between the adjoining positive and negative plates with the result that short circuiting occurs. According to this invention, while the positive plates rest on the aforesaid cradles, the negative plates are formed with recesses so as to clear the cradles on which the positive plates rest, and between the cradles a third cradle is provided and lugs on the negative plates are adapted to rest on the third cradle which consists of a support or strip of wood or other suitable non-conducting material with grooves, if desired to take the lugs.

In order to enable this invention to be readily understood reference is made to the accompanying drawings in which:—

Figures 1 and 2 are end and side views respectively of a secondary battery embodying my invention, the battery box being shown in section. Fig. 3 is a vertical cross section of an advantageous form of plate.

In the accompanying drawings, $a$ is the battery box, fitted with the usual lining, $b$, and the plates, $c$, which are formed at their lower ends like ordinary plates, are supported upon wooden cradles or strips, $d$, of a known type. The box is closed by any suitable lid, $e$. Now according to these improvements, plates of one sign, that is to say either the positive or the negative plates, being supported upon these cradles, plates of the opposite sign are supported as hereinafter described. For instance, referring to Figs. 1 and 2, if $c$ are the positive plates and these rest upon the cradles, $d$, then the negative plates, $f$ are cut away at $q$, so that spaces are left between the plates, $f$, and the supports, $d$, at these places. Between the cradles, $d$, the negative plates, $f$, are supported by a strip or cradle, $h$, and the plates, $f$, are formed with feet or lugs, $j$, so that the cradles, $h$, are not as high as the cradles, $d$. Of course there might be two such strips as, $h$, for the support of the plates, $f$. The cradles, $d$ and $h$, may be kept upright and prevented from tilting or falling over by cutting reversely inclined grooves, $s$, in their bases and inserting into such grooves cross laths or strips, $t$. The positive plates, $c$, are shown as strengthened by a wide peripheral rib, $k$, and also with vertical ribs, $l$, and transverse ribs, $m$. Plates of this description are frequently fractured at the lugs, $o$, and to enable this to be remedied the opposite corner of the plate may be of equal thickness to the rib $k$ as at $n'$, Fig. 2, so that if the plate should be fractured at the part or fillet, $n$, which also corresponds in thickness to the rib $k$ and to which the lug, $o$, is joined, the plate is simply turned side for side and the old lug or a new one is burned on to the corner or fillet, $n'$. These plates may also be provided with strengthening ribs $n^2$ which project from the corners $n$, $n'$ toward the center of the plates, these ribs being wedge shaped and merging with the plate at their inner ends. If desired the corner, $n'$, might be formed at the bottom of the plate, in which case the plate would be inverted instead of being changed side for side.

An advantageous form of plate embodying the foregoing improvements is formed of gradually increasing thickness from top to bottom, as shown in Fig. 3, so that a greater mass of metallic lead is found at the bottom of the plate where the specific gravity of the battery fluid is greatest.

What I claim as my invention and desire to secure by Letters Patent is:

1. A secondary battery comprising in combination a cell; positive plates; negative plates; two supports common to plates of one sign and situated one toward each side of said cell; a central intermediate support common to plates of the opposite sign of less height than the two supports, and arranged between said two supports, said plates of opposite sign each having a single central lug on its lower edge adapted to stand on the intermediate support and a recess in said lower edge on each side of said central lug adapted to straddle the two supports.

2. A secondary battery plate formed with a central depending lug upon the lower edge and a recess on each side of the lug, said plate having a thickened edge or rim the upper corner spaces inclosed by this rim being filled in so that the rim is widened at the corners, said plate being formed of gradually increasing thickness from top to bottom.

In testimony whereof I have signed my name to this specification in the presence of two subscribing witnesses.

ALFRED HENRY DARKER.

Witnesses:
DUNCAN MCLAREN,
F. HOWELL.

Copies of this patent may be obtained for five cents each, by addressing the "Commissioner of Patents, Washington, D. C."